(12) United States Patent
Vasudeva et al.

(10) Patent No.: US 9,565,846 B2
(45) Date of Patent: Feb. 14, 2017

(54) WASTE BASKETS OR THE LIKE, WITH INSECT TRAPS

(71) Applicant: BUG ELIMINATION AND PREVENTION CORPORATION, Waterloo (CA)

(72) Inventors: Kailash C. Vasudeva, Waterloo (CA); Jose A. da C. Medeiros, Cambridge (CA); Satnam Singh, Kitchener (CA)

(73) Assignee: BUG ELIMINATION AND PREVENTION CORPORATION, Waterloo (CA)

( * ) Notice: Subject to any disclaimer, the term of this patent is extended or adjusted under 35 U.S.C. 154(b) by 173 days.

(21) Appl. No.: 14/226,044

(22) Filed: Mar. 26, 2014

(65) Prior Publication Data

US 2014/0290122 A1   Oct. 2, 2014

Related U.S. Application Data

(60) Provisional application No. 61/805,448, filed on Mar. 26, 2013.

(51) Int. Cl.

| *A01M 23/00* | (2006.01) |
|---|---|
| *B65F 1/14* | (2006.01) |
| *A01M 1/02* | (2006.01) |
| *A01M 1/10* | (2006.01) |
| *A01M 1/14* | (2006.01) |
| *A01M 1/20* | (2006.01) |
| *A01M 1/24* | (2006.01) |

(52) U.S. Cl.
CPC ............ *A01M 1/023* (2013.01); *A01M 1/103* (2013.01); *A01M 1/14* (2013.01); *A01M 1/2011* (2013.01); *A01M 1/2033* (2013.01); *A01M 1/245* (2013.01); *B65F 1/14* (2013.01); *B65F 1/141* (2013.01)

(58) Field of Classification Search
CPC ........ A01M 1/02; A01M 1/023; A01M 1/103; A01M 1/14; A01M 1/2011; A01M 1/2033; A01M 23/00; B65F 1/14; B65F 1/141; B65F 2210/156
USPC .............................................. 43/58, 120, 66
See application file for complete search history.

(56) References Cited

U.S. PATENT DOCUMENTS

| 1,223,525 A * | 4/1917 | Schallaman ............. B65F 1/02 |
|---|---|---|
| | | 43/120 |
| 1,278,770 A | 8/1918 | Jones |

(Continued)

FOREIGN PATENT DOCUMENTS

JP         S52142870 A     11/1977

*Primary Examiner* — Danielle Clerkley

(57) ABSTRACT

A container is combined with a base having insect combating features, i.e. for trapping and/or poisoning of insects, preferably but not necessarily combined with insect attracting elements. In particular, the container may be a waste basket, and the targeted insects may be bed bugs, and/or roaches, and/or ants. The assembly has a container portion and a base portion. The interior of the base portion is accessible by insects via one or more small gaps or openings, and contains the trapping and/or poisoning elements, which may include a replaceable glue strip or the like. Preferably, the assembly is also be provided with insect attracting means, which may include chemical attractants, carbon dioxide generation, and/or heat. In some embodiments, separate areas may be provided to combat different insects.

8 Claims, 17 Drawing Sheets

(56) References Cited

U.S. PATENT DOCUMENTS

| | | | |
|---|---|---|---|
| 1,472,476 A * | 10/1923 | Kendzierski | B65F 1/1607 |
| | | | 220/229 |
| 1,597,238 A | 8/1926 | Lee | |
| 2,562,663 A | 7/1951 | Golaszewski | |
| 5,930,944 A * | 8/1999 | Knuppel | A01M 1/026 |
| | | | 43/114 |
| 6,370,813 B1 * | 4/2002 | Nelson | A01M 1/2005 |
| | | | 43/121 |
| 2006/0016120 A1 * | 1/2006 | Masters | A01M 1/023 |
| | | | 43/114 |

* cited by examiner

WASTE BASKETS OR THE LIKE, WITH INSECT TRAPS

REFERENCE TO RELATED APPLICATION

This is a formal application based on, and claiming the benefit of, U.S. provisional patent application No. 61/805,448, filed Mar. 26, 2013.

BACKGROUND OF THE INVENTION

This invention relates to waste baskets or other containers, combined with insect combating means such as trapping and/or poisoning, preferably also with insect attracting means. In preferred embodiments, the invention relates to waste baskets, and is targeted specifically to bed bugs and/or roaches and/or ants.

For convenience, the invention will be described primarily with reference to "waste baskets" and "bed bugs", but it should be understood that the invention could be adapted to containers other than waste baskets, and to certain insects other than bed bugs, especially other crawling insects such as roaches, for example.

It should also be understood that "trapping" does not necessarily mean complete eradication. In some applications, the invention may be used simply to detect the presence of bed bugs, by trapping one or more bed bugs. This may then indicate the presence of a larger problem, requiring more aggressive solutions such as steam or chemical treatment.

Populations of insects such as bed bugs have resurged in recent years, particularly throughout parts of North America, Europe, and Australia. The increase of international travel in recent decades has contributed to the resurgence of these insects. There are many aspects of bed bugs that make it difficult to eradicate them once they have established a presence in a location. They are most commonly found in rooms where people sleep, and they generally hide nearest the bed or nearby furniture, baseboards, etc. Their flattened bodies allow them to conceal themselves in cracks and crevices around the room and within furniture. There is a serious need for efficient detection, trapping and monitoring tools to combat these insects.

The invention is intended for use primarily in homes, hotel rooms, offices and other settings where it may be especially desirable to disguise function as a bed bug trap. In a hotel room, for example, the hotel obviously might prefer that a guest not realize that there is a bed bug trap, in case that signals to the guest that there is a bed bug problem in the hotel. Similarly, in a home or office, disguising the trapping function may be desirable for the same reason.

Hotels are some of the most likely places for bed bugs or roaches to proliferate, due to the transient hotel guests, and coming and going of their suitcases and possessions. It is extremely important for anyone with a bed bug or roach problem, but for hotels in particular, to be able to detect the presence of them, and preferably to trap them as well, before the problem spreads from room to room. At the same time, as stated above, it is also extremely important to avoid the stigma of an insect infestation, or even of the possibility of an infestation. It is therefore desirable to have an insect trap which serves another function in parallel, i.e. with no indication that it is in fact an insect trap. It is therefore particularly advantageous to combine the insect trap with a waste basket, because a hotel room guest expects to see a waste basket, and is not likely to detect that the waste basket also acts as an insect trap.

Prior art such as U.S. Pat. No. 1,276,770, JP52-142870, JP 51-109179 and JP 4-127704 disclose garbage cans, which combine a trap at the bottom to passively trap animals like rats and roaches that are attracted by food garbage. Some garbage cans also combine various bait stations for dispensing poisoned bait to kill pests that are attracted to the garbage can, as shown in U.S. Pat. No. 6,470,622, and WO2007108821A.

SUMMARY OF THE INVENTION

In view of the preceding, the invention provides an assembly which combines a container with a base, the base having one or more insect combating features, i.e. trapping and/or poisoning, preferably but not necessarily combined with insect attracting means.

In preferred embodiments, the container is a waste basket, but obviously it could be a container for some other purpose, such as a laundry hamper or a storage container for items such as clothing, toys, books, etc., for example.

Also in preferred embodiments, the targeted insects are bed bugs, and/or roaches, and/or ants.

More specifically, the assembly has a container portion and a base portion. The base portion has insect combating means therein, namely trapping and/or poisoning means to trap and/or poison targeted insects. The assembly is normally closed so that there is no access to the insect combating means except via one or more gaps sized sufficiently to permit insects to enter, but can be opened to provide access to the insect combating means for cleaning, maintenance, or component replacement.

The trapping means may include a glue strip or other suitable trapping means, preferably mounted on a removable and replaceable element. Similarly, any poisoning means may be mounted on a removable and replaceable element.

In preferred embodiments, the assembly may also be provided with insect attracting means, which for bed bugs may include one or more of: a carbon dioxide generator; a heat source; and a chemical or biochemical lure which may include kairomones and/or pheromones for example. For other insects, the attracting means can be selected as appropriate for the particular targeted insects.

In some embodiments, the base portion may include separate areas for different insects, for example a bed bug trapping area and roach and ant poison areas, potentially each with separate attractants appropriate to the insect.

Details of the invention will be explained in the detailed description which follows.

BRIEF DESCRIPTION OF THE DRAWINGS

Preferred and alternative embodiments of the invention will be described with reference to the accompanying drawings, in which:

FIG. 10b is an exploded view corresponding to FIG. 10a;

DETAILED DESCRIPTION

Figure 1:
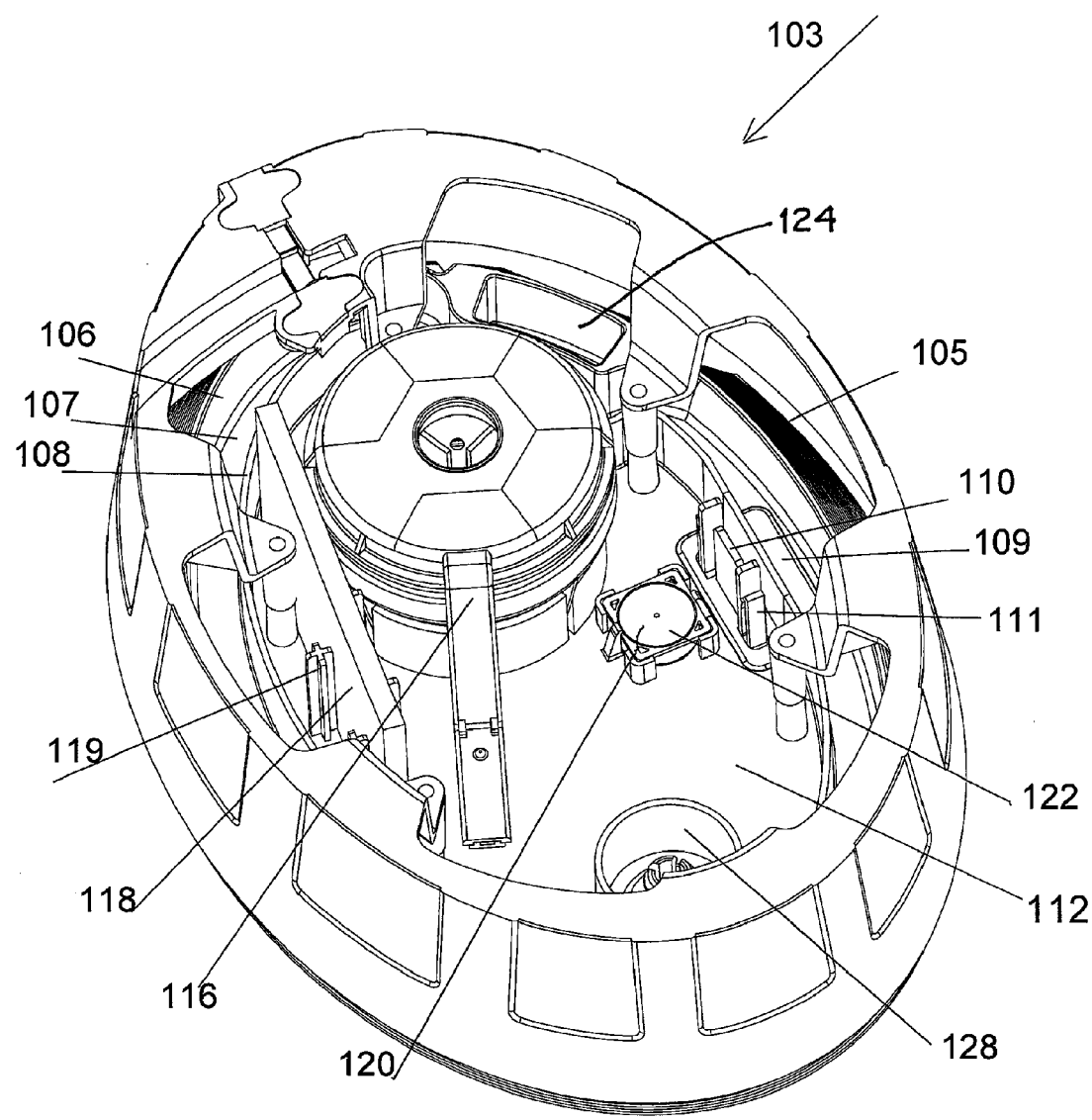
FIG. 1 is a perspective view of a preferred embodiment, in the open position, with a carbon dioxide generator, heat pack, lure and glue trap in place for bed bugs, and roach bait for roaches.

In the following embodiments of the invention, assemblies of containers with traps designed for bed bugs and roaches are shown. However, the invention is not limited to these two insects. It should be understood that persons knowledgeable in the field of the invention could adapt the invention for use with other kinds of crawling insects. Ants are also specifically contemplated, for example.

Several examples of the invention are described below. In each example, the insect combating means is in the base portion underneath the container portion. Various configurations may be used to access the insect combating means for removal of dead insects, replacement of components, etc. For example, in the preferred embodiment, the container portion rotates about a vertical axis to expose the insect combating means. In other embodiments, the insect combating means may be accessed through the container portion via a removable bottom. In yet other embodiments, access may be via drawers, swing-out elements or access doors, as described below.

Preferred Embodiment

As shown in FIGS. 1-8, a preferred embodiment of the combined container and insect combating assembly includes a container portion 102 and a base portion 103. The interior of the base portion 103 is accessible by insects via a gap 104, which in this embodiment is between an outer wall 105 of the bottom of the base portion, and a cover 140 which is integral with or secured to the base portion. The base portion has insect combating means to trap insects therein, and may also have insect attracting means, as described below.

In this embodiment, the container portion is supported above the base portion. In other embodiments, the relative positioning of the base portion and the container portion could vary.

Figure 2:
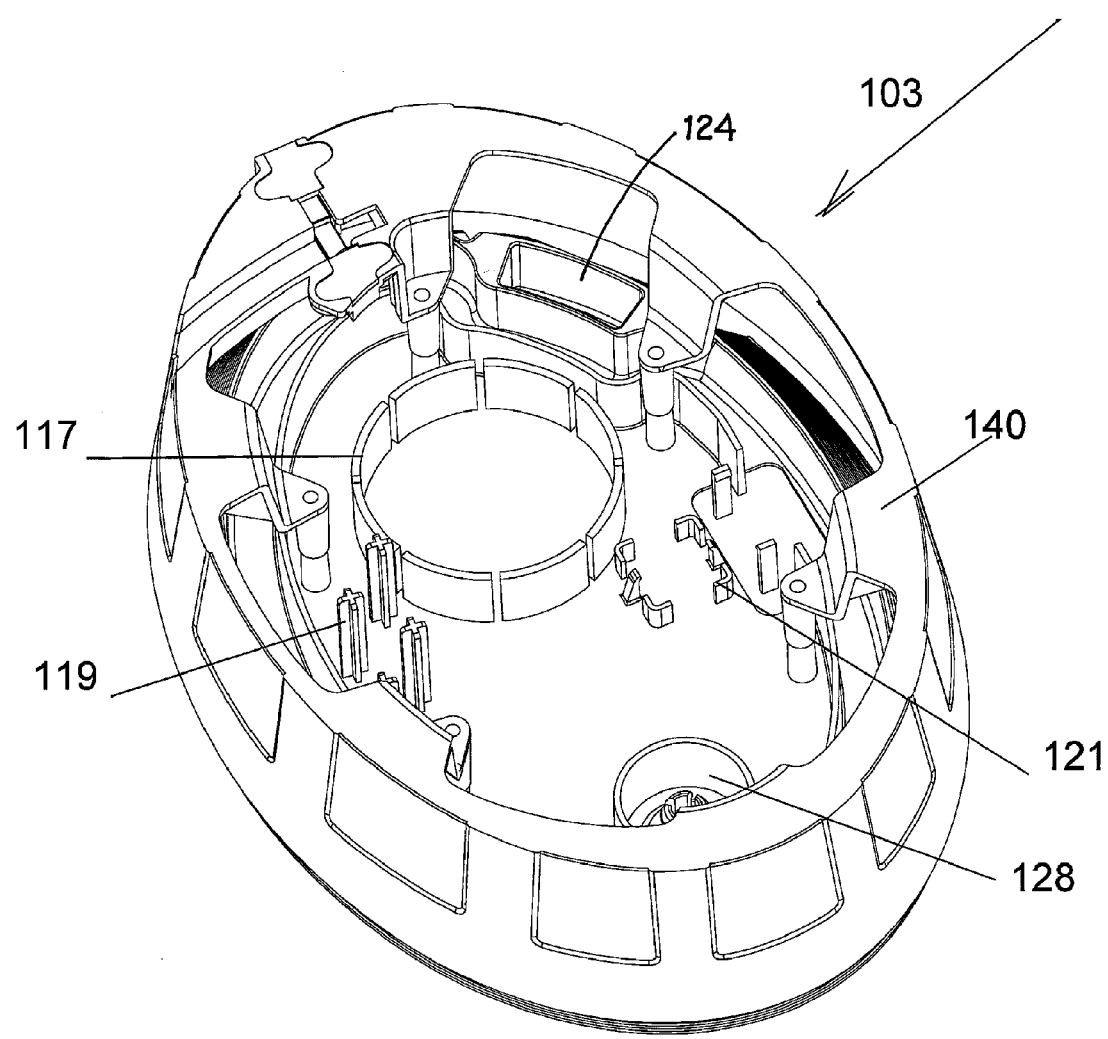
FIG. 2 is an substantially identical view, but without the carbon dioxide generator, heat pack, lure, glue trap, and roach bait.
Figure 3A:
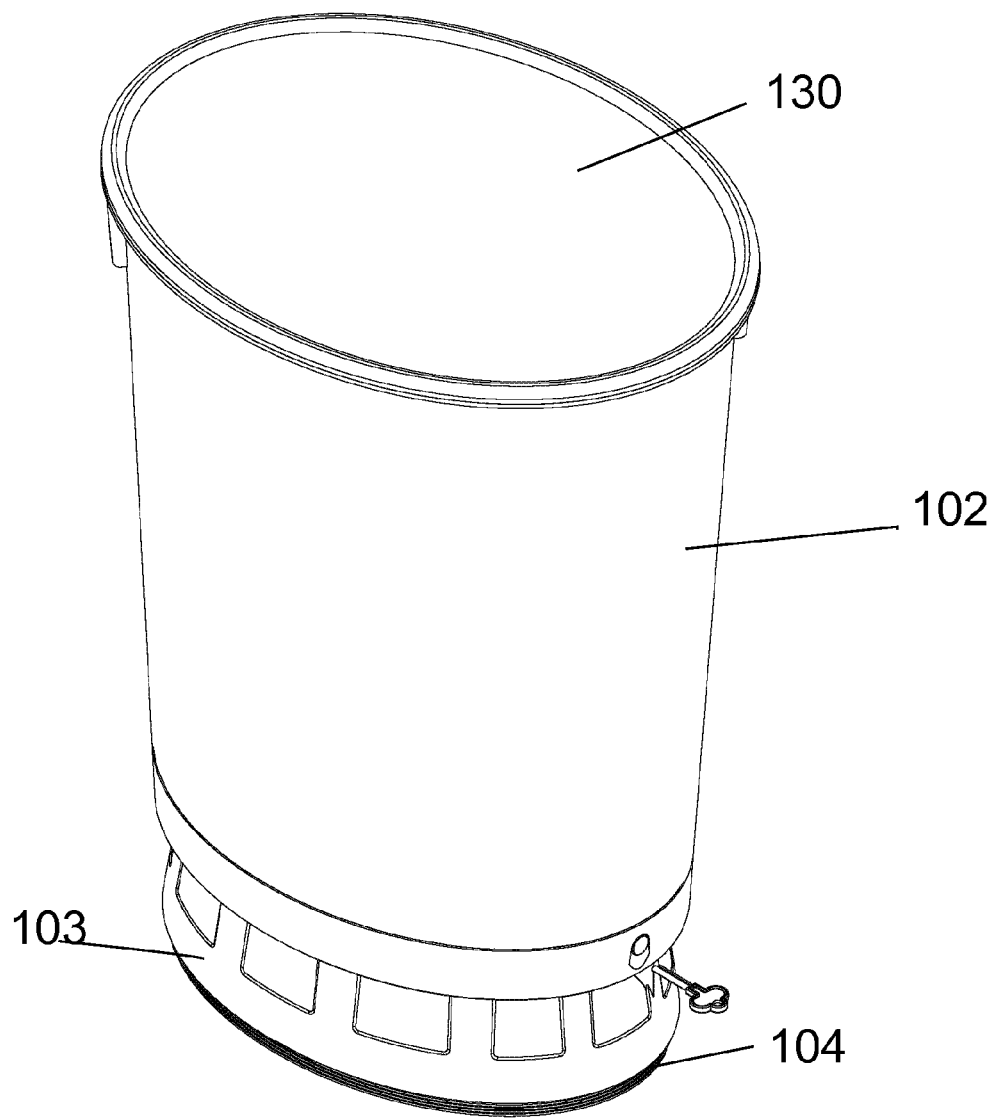
FIG. 3a is a perspective view showing the entire assembly, in the closed position.
Figure 3B:
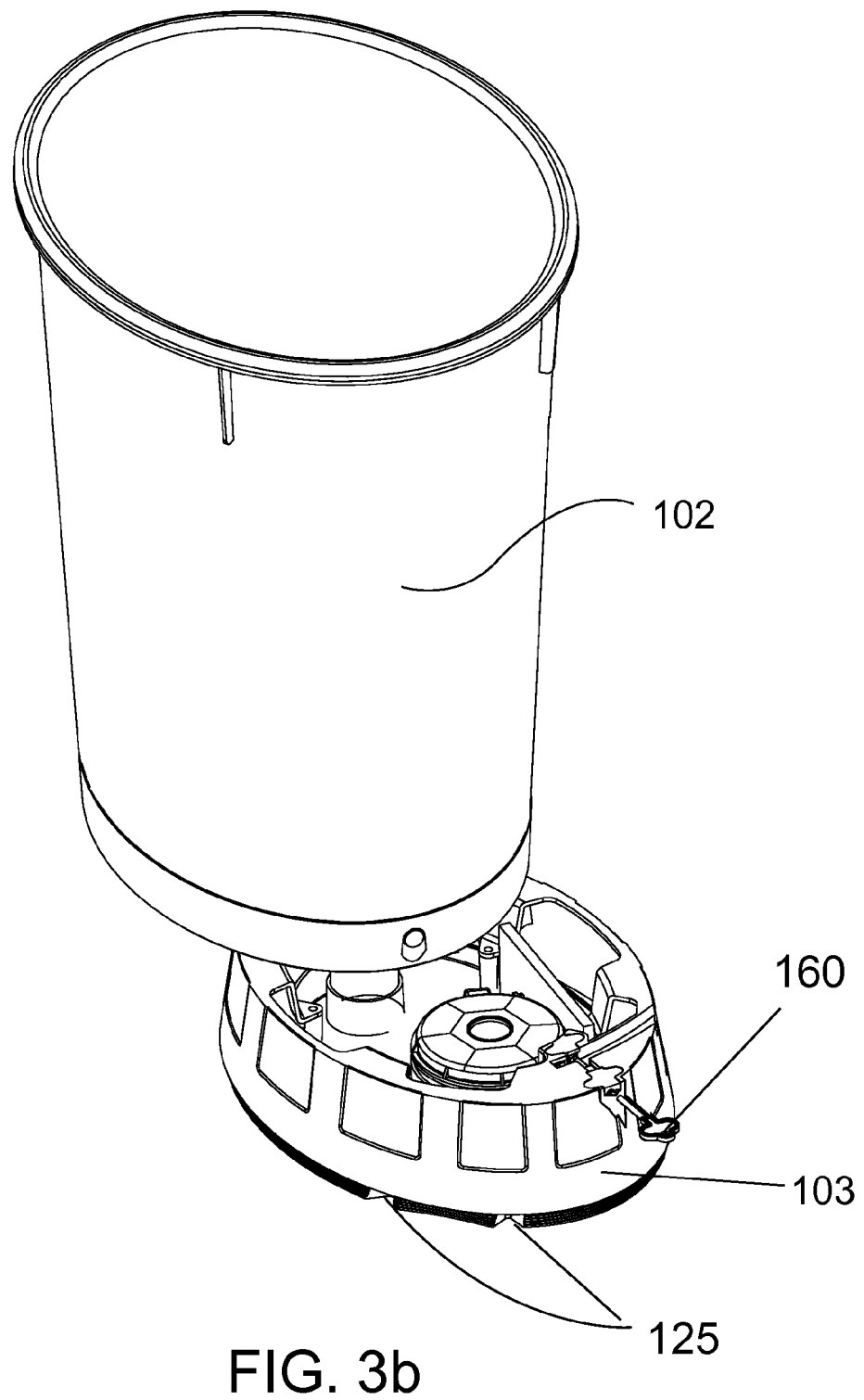
FIG. 3b is a perspective view showing the entire assembly, in the open position.

Referring to FIGS. 1 and 2, the structure of the base portion 103 can be seen more clearly. Normally, the interior of the base portion will not be visible, because the container portion will be rotated over it into the position shown in FIG. 3.

The outer wall 105 of the base portion preferably is textured and preferably is angled as a ramp, so that bed bugs are able to climb it. At the top of the outer wall, a pitfall 106 is created, creating a confinement area 107 between the outer wall and an inner ring 108. The bed bugs are not able to climb out of the confinement area, by virtue of its walls being generally vertical and generally smooth. The bed bugs are free to wander within the confinement area, where they will eventually die and remain until removed, or where they can wander to an optional but preferable glue pad 109. The glue pad traps them, and preferably is removable and replaceable.

In this embodiment, the glue pad 109 is mounted on a carrier 110, which slides into position on posts 111 to define part of the inner ring 108. However, it could be mounted by any suitable means, separate from the inner ring 108, i.e. not defining part of the inner ring. Alternatively it could be "free floating" within the confinement area, i.e. not secured in any one position.

The inner ring 108 defines an inner space 112 which could be substantially empty and serving no purpose, but which preferably includes one or more of the following three known bed bug attractants: carbon dioxide, heat, and chemical lures. For example, a carbon dioxide generator 116 may be positioned in a frame 117; a heat pack 118 may be positioned in heat pack supports 119; and a chemical lure pack 120 may be positioned in a holder 121.

The carbon dioxide generator 116 may be any known carbon dioxide generator, for example one similar to the one described in US2014/033597A, published in Feb. 6, 2014, capable of generating small volumes of carbon dioxide for up to six hours. The carbon dioxide generator can be a carbon dioxide gas container, a dry ice container or other known carbon dioxide generator. For example, the carbon dioxide generation can be a container, in which there are some chemical tablets that can produce carbon dioxide by adding water or solution. Or the carbon dioxide generator can be a stack of electrochemical cells that decompose organic carboxylated compounds into carbon dioxide.

The heat pack 118 may be any known heat pack that can product heat to function as an insect lure or more specifically as a bed bug lure. For example it could be chemical heat pad of the type that is typically used for warming hands or other body parts, comprising air-activated ingredients like iron and activated carbon. The heat from such heat packs can typically last for up to six hours or more. Alternatively, heat could be provided by a small electric heating element, preferably battery powered to avoid the guest questioning why there is a power cord running to a waste basket.

The chemical lure pack 120 may be of a type having a peel-back cover 122, to release kairomones, pheromones and/or other chemical or biochemical luring substances. For example, chemical lure mixtures as disclosed in WO2013/071075A1 could be used, comprising a combination of Nonanal, 1-octen-3-ol, L-lactic acid, spearmint oil, and coriander Egyptian oil.

The base portion may also have a somewhat differently configured outer wall portion 123, for roaches to climb in order to access roach bait (poison) placed in a roach bait well 124. For roaches, the gap 104 (seen on the right side of FIG. 6) is made somewhat larger that for bed bugs. Preferably, if there are two separate outer wall portions, i.e. for different insects, they are separated by smooth recessed areas 125 so that bed bugs do not enter the roach area, and vice versa.

With roaches (and ants), it is intended that they should consume the poison bait, and eventually die from it, without necessarily remaining in the base portion. With bed bugs, however, it is intended that they should fall into the pitfall and remain there until removed.

In the embodiment as illustrated, the roach trapping area extends around only a small portion of the circumference of the trapping area. However, it should be understood that there could be equally sized areas for each insect, or the entire trapping area could be configured only for bed bugs or only for roaches, or conceivably for other insects.

It should also be understood that the ramp areas need not extend all the way around the circumference, i.e. there could be specific insect entrance areas which do not extend around the circumference. However, for visual appearance reasons only, normally the ramp areas will extend around the entire circumference.

The inner space 112 also has a pivot tube 128 extending from the lower surface of the space, to support the container portion 102, as described below in greater detail.

Figure 4:
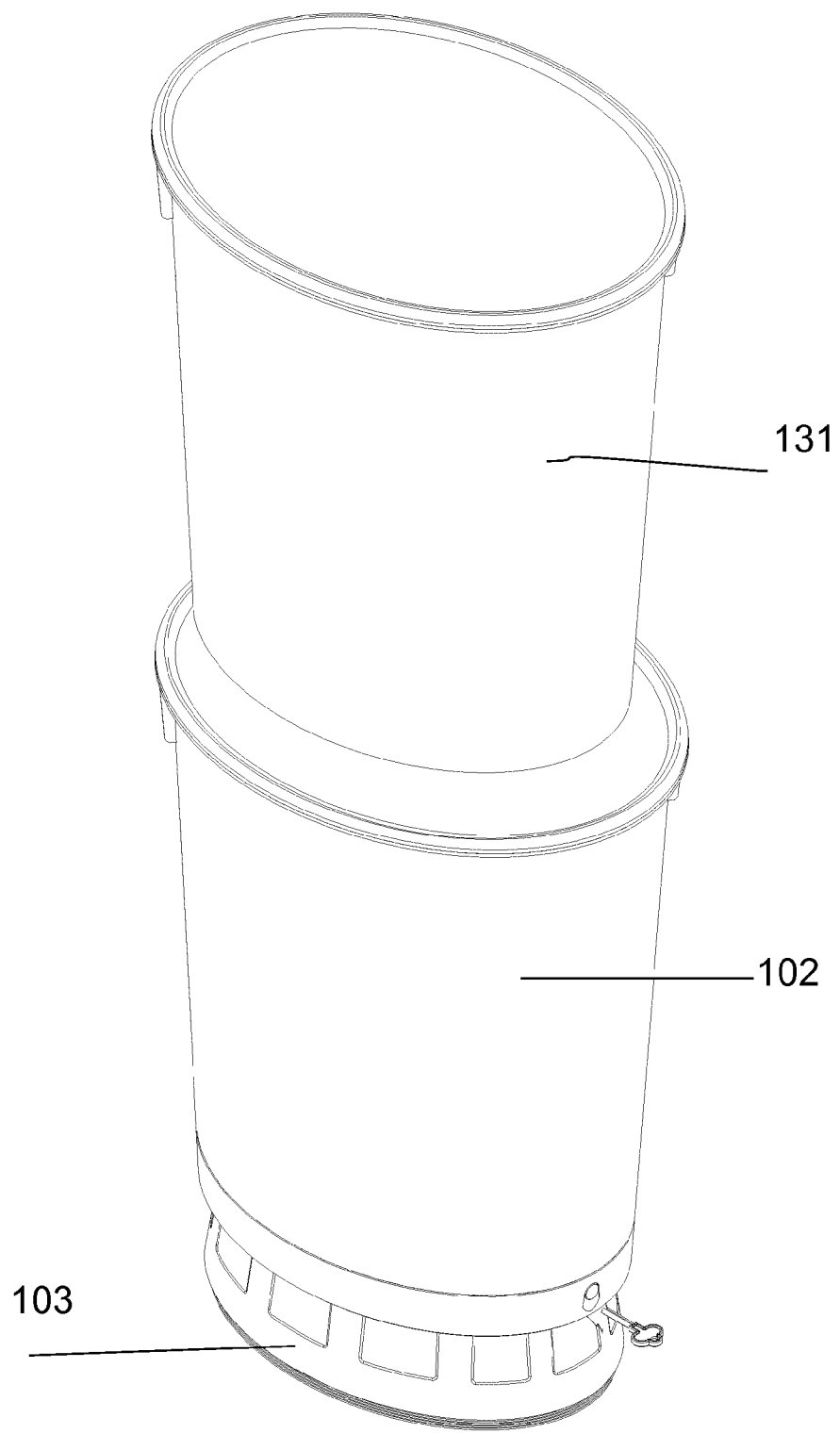
FIG. 4 is a view similar to FIG. 3a, but showing a liner bucket exploded above the waste basket as an option.

The container portion 102 in this embodiment has the general appearance of a conventional waste basket, with an open top 130. If desired, as shown in FIG. 4, a removable liner 131 could be provided, for easier emptying and cleaning. An optional lid could be provided if desired (not shown).

Extending down from the bottom of the container portion is a cylindrical extension 132 which fits within the pivot tube 128. The two components are secured together by installing a flanged plastic locking pin 133.

Figure 8:
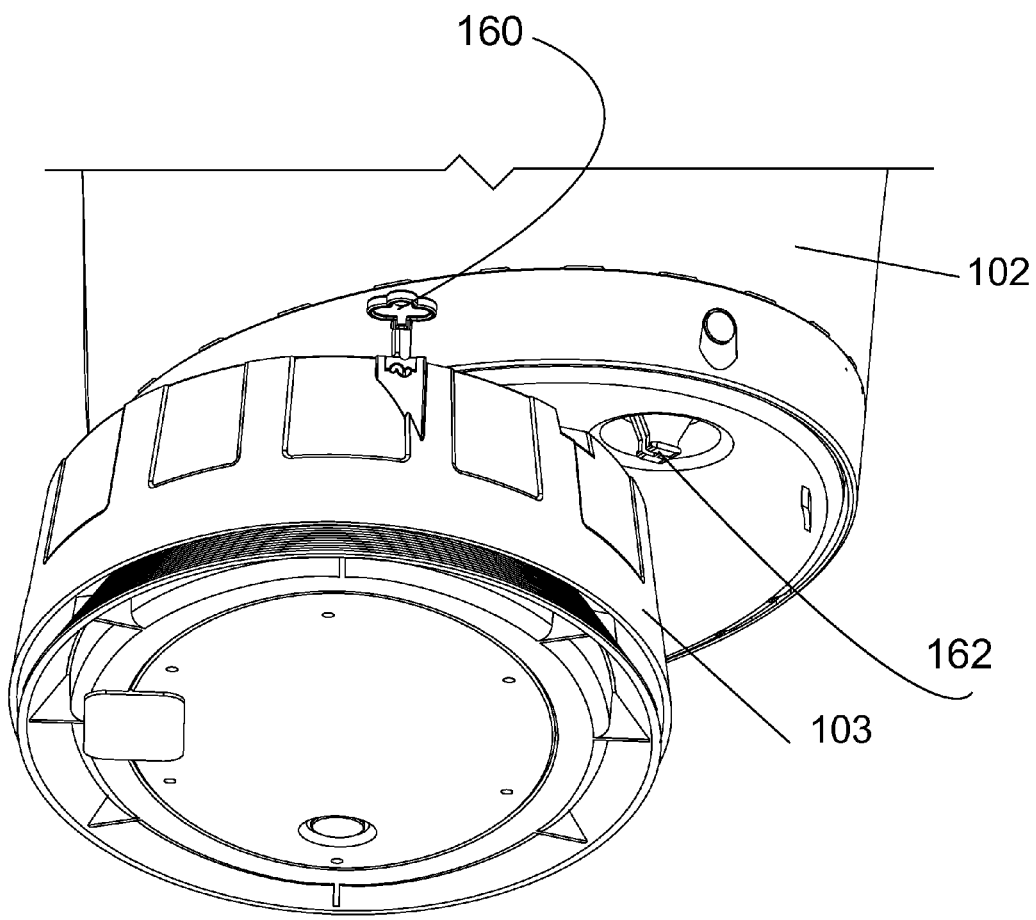
FIG. 8 is a perspective view showing an example of a locking mechanism to prevent access to the interior of the base portion, by children and pets for example.

It is highly desirable that the container portion should remain in position over the base portion in use, without being easily dislodged. This could be accomplished in a variety of ways, such as using a clip, or having to slightly lift the container portion from the base portion before it could be rotated, or by any other suitable means. In this embodiment, this is accomplished by the use of a locking mechanism as shown in FIG. 8, using a key 160 to disengage a clip 162 which otherwise holds container portion in place on the base portion. This is desirable not only to keep the assembly in the closed position for aesthetic reasons, but also for child and pet safety.

Figure 5:
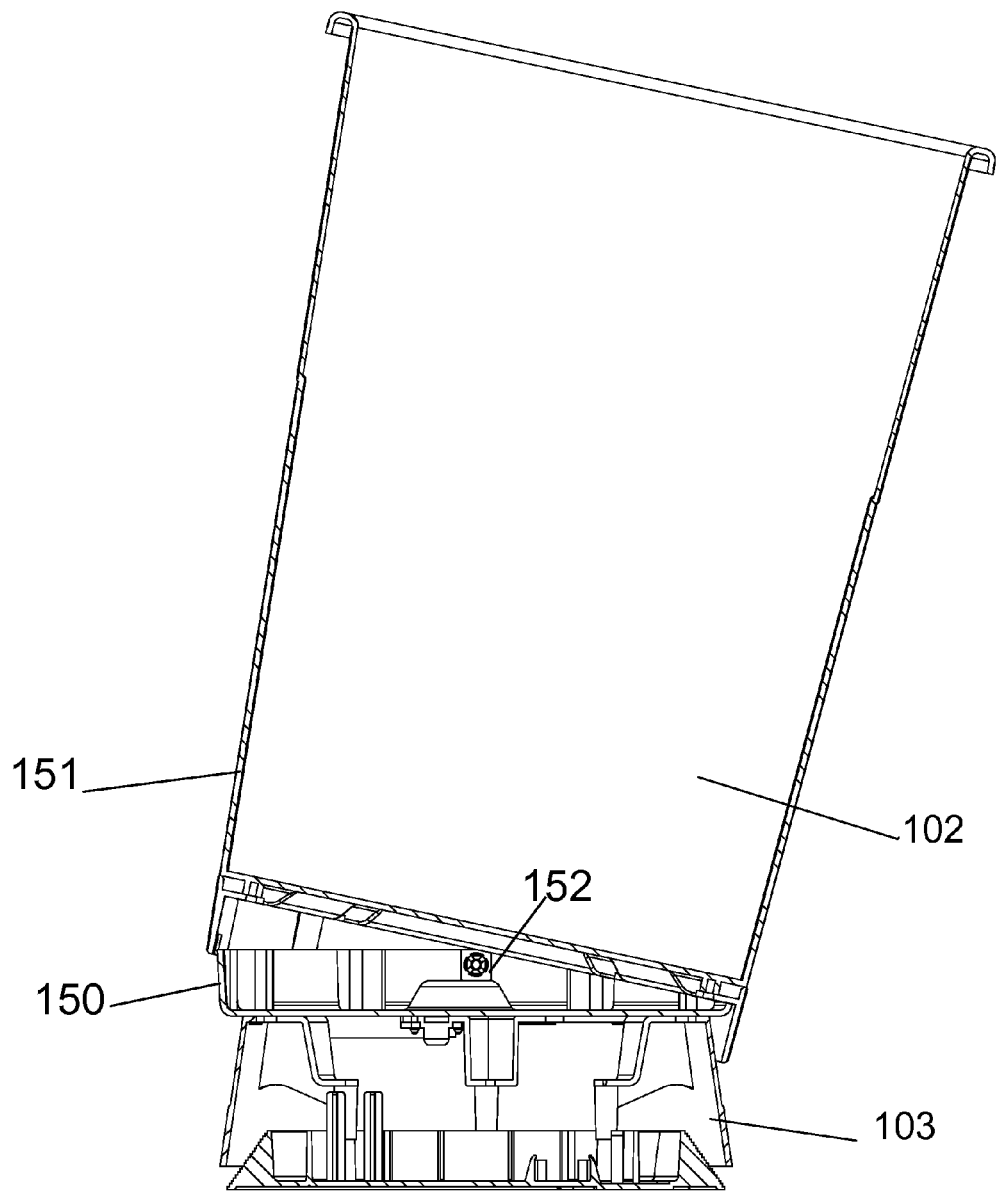
FIG. 5 is a cross-sectional elevation view showing the assembly and the option of a tiltable waste basket.
Figure 6:
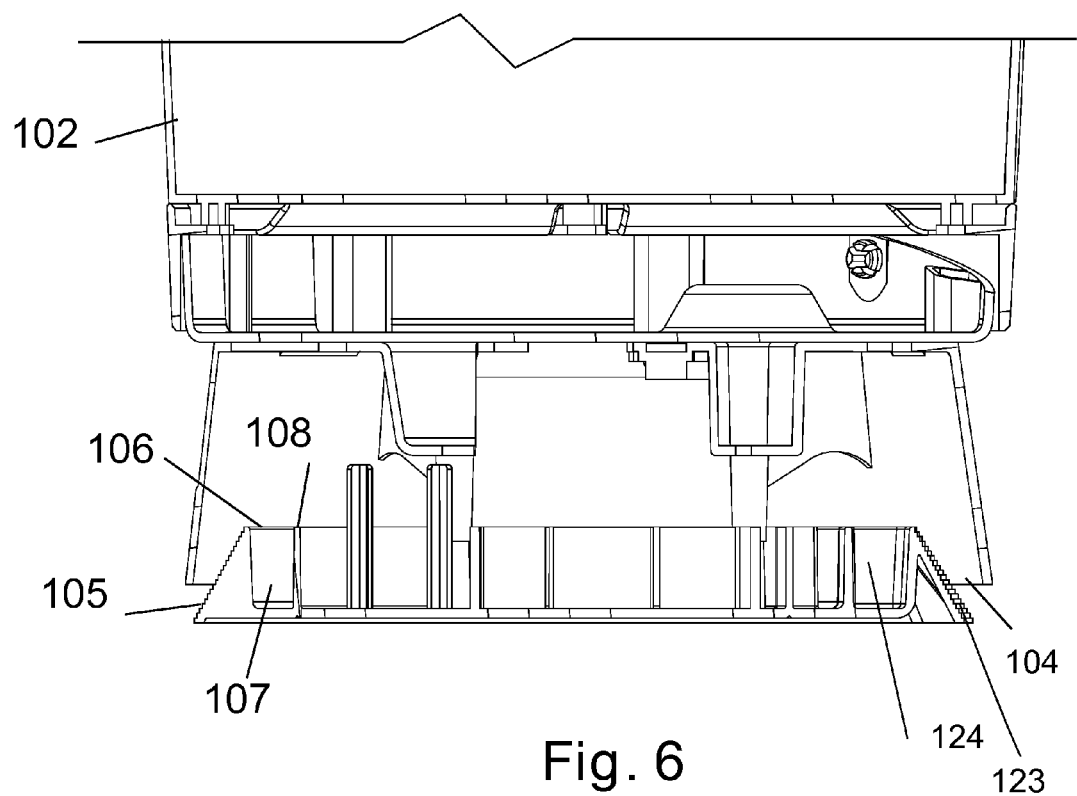
FIG. 6 is a similar cross-sectional elevation, but with a non-tiltable waste basket.
Figure 7:
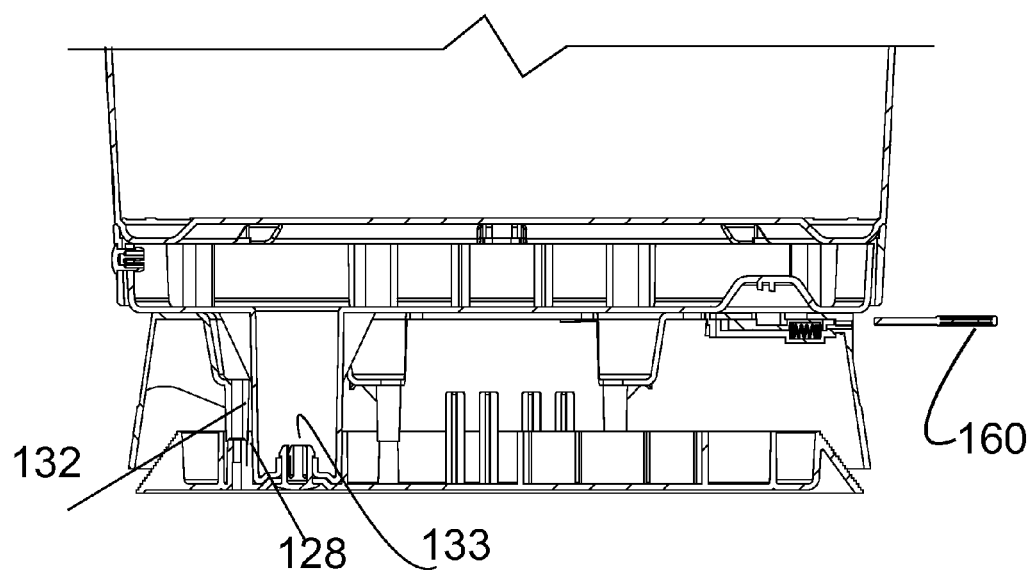
FIG. 7 is a cross-sectional elevation to show how the waste basket is pivotally secured to the base portion.

If desired, as shown in FIG. 5, the container portion can have a fixed lower portion 150 and a tiltable upper portion 151, pivoting on the lower portion via pivot points 152 on opposite sides of the container.

First Alternative Embodiment

Figure 9:
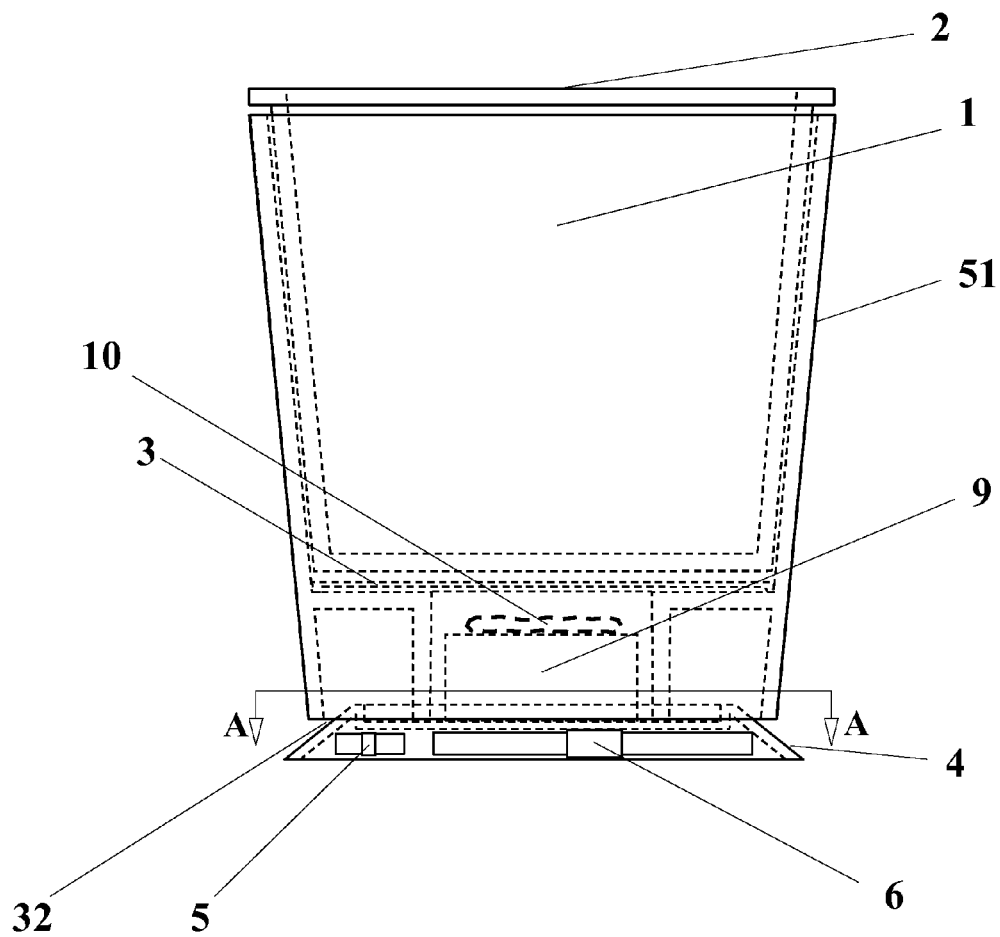
FIG. 9 is an elevation view of a second example of the invention.
Figure 10A:
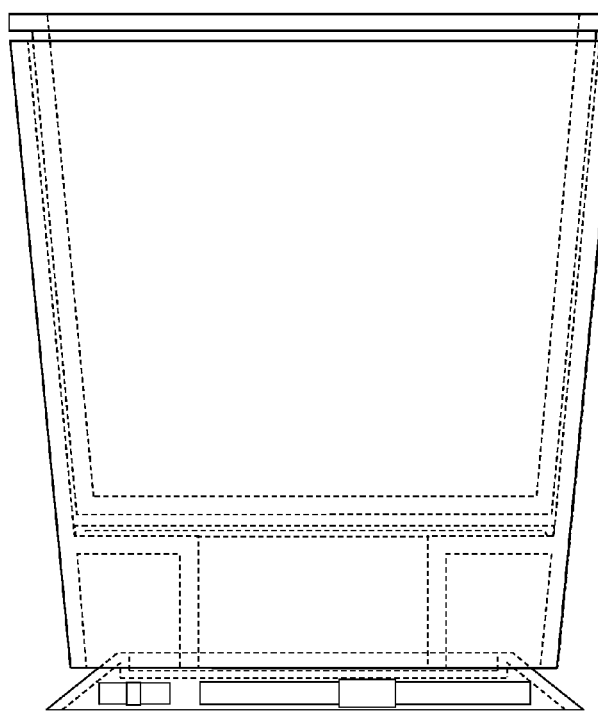
FIG. 10a is a side view of the second example.
Figure 10B:
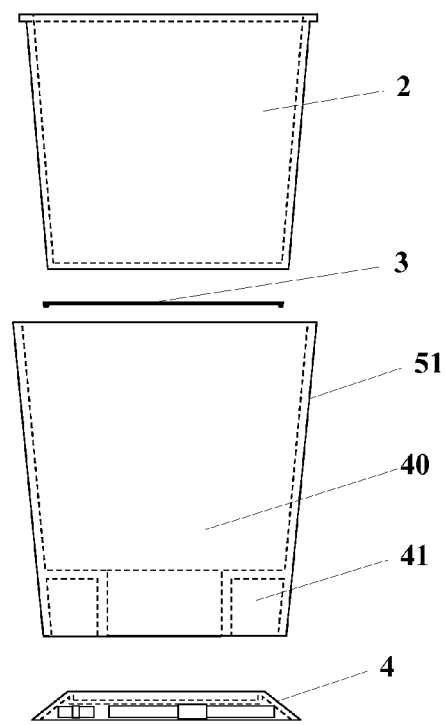
Figure 11:
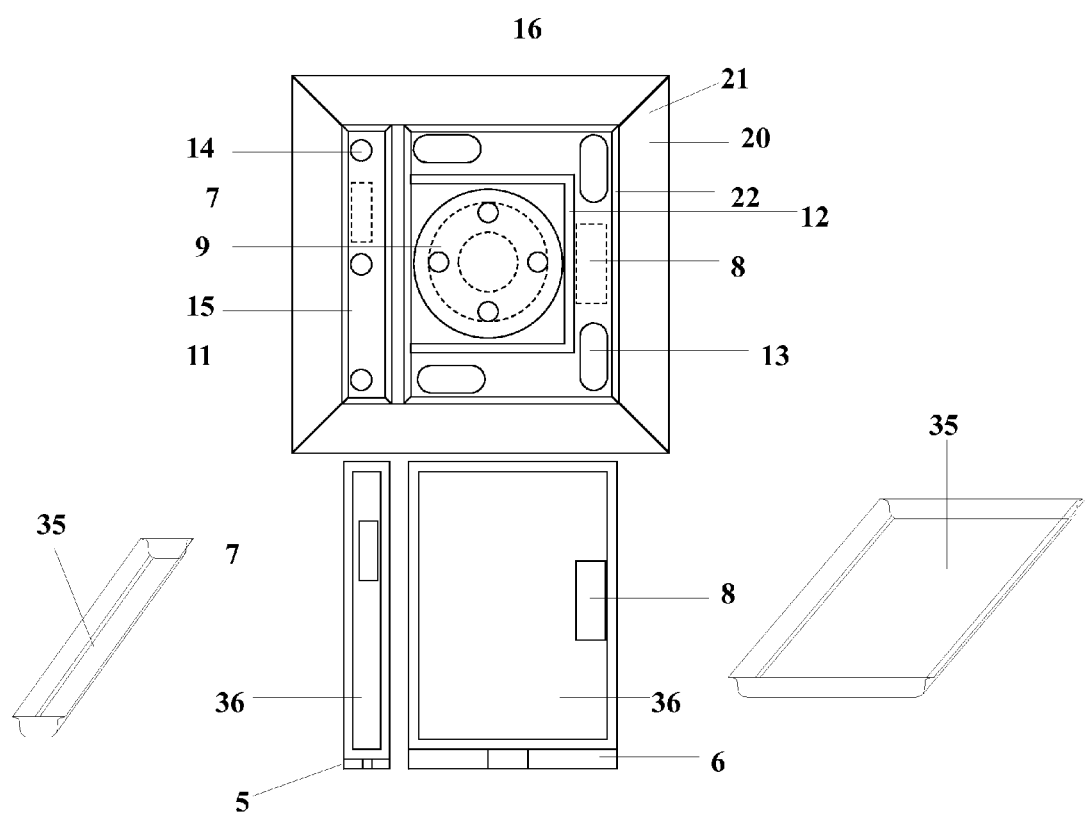
FIG. 11 is a top view of the base portion of the second example.

Referring to FIGS. 9-11, the assembly includes a container portion 1 and a base portion 4. The two portions may be securable to each other detachably, or fixed to each other, by any suitable means. For example, they may be secured to each other by clips or screws, but obviously many other conventional attachment means could also be used.

The container portion 1 includes an outer shell 51, and a false/removable bottom 3. The outer shell 51 is separated into a storage space 40 and a covered space 41 by the false/removable bottom 3. Optionally, a removable pail 2 may positioned in the storage place 40. Alternatively, waste or other items can be placed directly into the storage space 40, but a removable pail facilitates emptying and cleaning.

The covered space 41 provides space for the base portion 4 and any attracting means. Thus the base portion 4 can be substantially hidden under the container, so that the assembly is perceived only as a container, such as waste basket or garbage can, and not as an insect trap. This configuration also makes the interior of the base portion, containing the insect combating means and any attractants, inaccessible to children or pets, for safety purposes.

The false/removable bottom 3 permits access to the insect combating means and any attractants from above, for the purpose of changing the attracting means, poison, removing trapped insects, etc. Therefore in this embodiment the container portion and the base portion can be permanently secured to each other if desired.

A gap 32 is formed between the container portion 1 and the base portion 4. The gap 32 is large enough to allow bed bugs and roaches to enter into the base portion 4. The size of gap 32 can be adjusted according to the size of the targeted insects.

As illustrated, the base portion 4 has a generally rectangular configuration (conforming to the container portion 1). Clearly, the shape could be varied as desired. The base portion includes an insect combating means area, which is defined by surrounding outer wall 20. The outer surface 21 of the outer wall 20 is sufficiently textured for a bed bug or roach to climb, and the inner surface 22 of the outer wall 20 is sufficiently smooth that a bed bug cannot climb out.

In this example, the trapping area is divided into two trapping areas by a dividing wall 11. One is a bed bug trapping area 15 and the other is a roach trapping area 16.

As shown in FIGS. 9 and 11, a bed bug lure 7 preferably is placed in the bed bug trapping area 15. A carbon dioxide generator 9 and a roach lure 8 are kept in the roach trapping area 16. To avoid roaches approaching the carbon dioxide generator 9, a dividing wall 12 also is provided. The dividing wall 11 and 12 also helps to support the outer shell 51 and/or the false/removable bottom 3. On the carbon dioxide generator 9, a heat pad 10 may be provided to supply heat attracting means for bed bugs. The attracting means and the location of the attracting means can be chosen and adjusted according to the targeted insects.

As shown in FIG. 11, a bed bug trap drawer 5 and a roach trap drawer 6 are provided beneath the bed bug trapping area 15 and the roach trapping area 16. The trap drawers 5 and 6 are slidable in and out of the base portion. One or more holes 14 above the bed bug trapping area 15 and one or more holes 13 above the roach trapping area 16 are provided, such that bed bugs in the bed bug trapping area 15 may fall through a hole 14, and roaches in the roach trapping area 16 may fall through one or more holes 13.

Insect combating means, such as a glue pad or strip 36 or any other conventional trapping means can be provided, so that the insects falling through the holes are caught. The glue pad or strip 36 can be provided in the trap drawer 5 and 6 directly, or preferably in a removable and replaceable tray 35.

When a bed bug or roach approaches the base portion from the surrounding floor area, it climbs the outer surface in an attempt to get to the lure or attractant, and then falls into one of the trapping areas 15 and 16. It migrates to one of the holes, from there will eventually migrate to the trap drawers 5 and 6, and be retained on the glue pad or strip 36. The trap drawers 5 and 6 can be checked regularly by pulling out those drawers.

Second Alternative Embodiment

Figure 12:
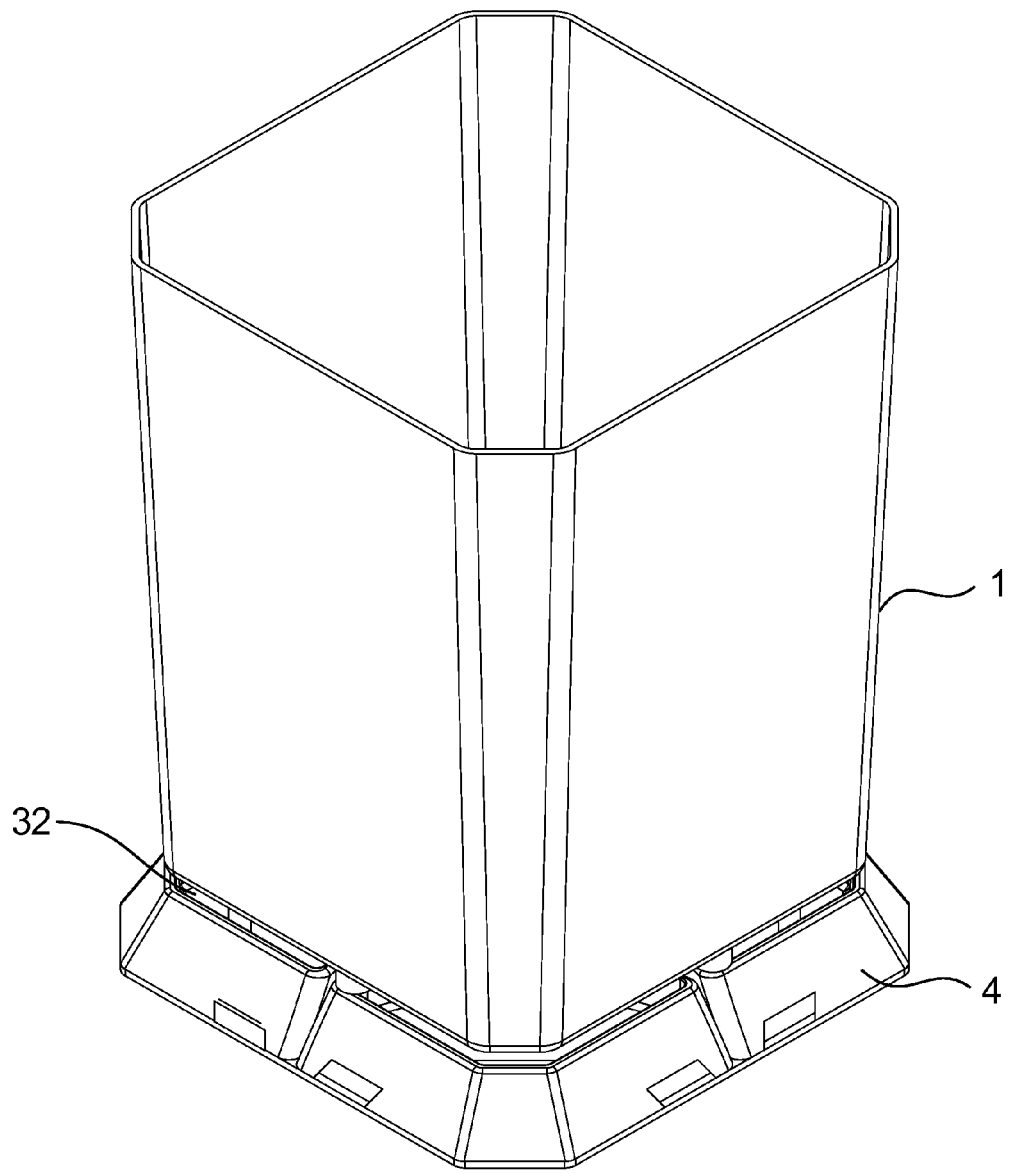
FIG. 12 is a perspective view of a third example of the invention, where areas for trapping or poisoning can be rotated out from under the container portion.
Figure 13:
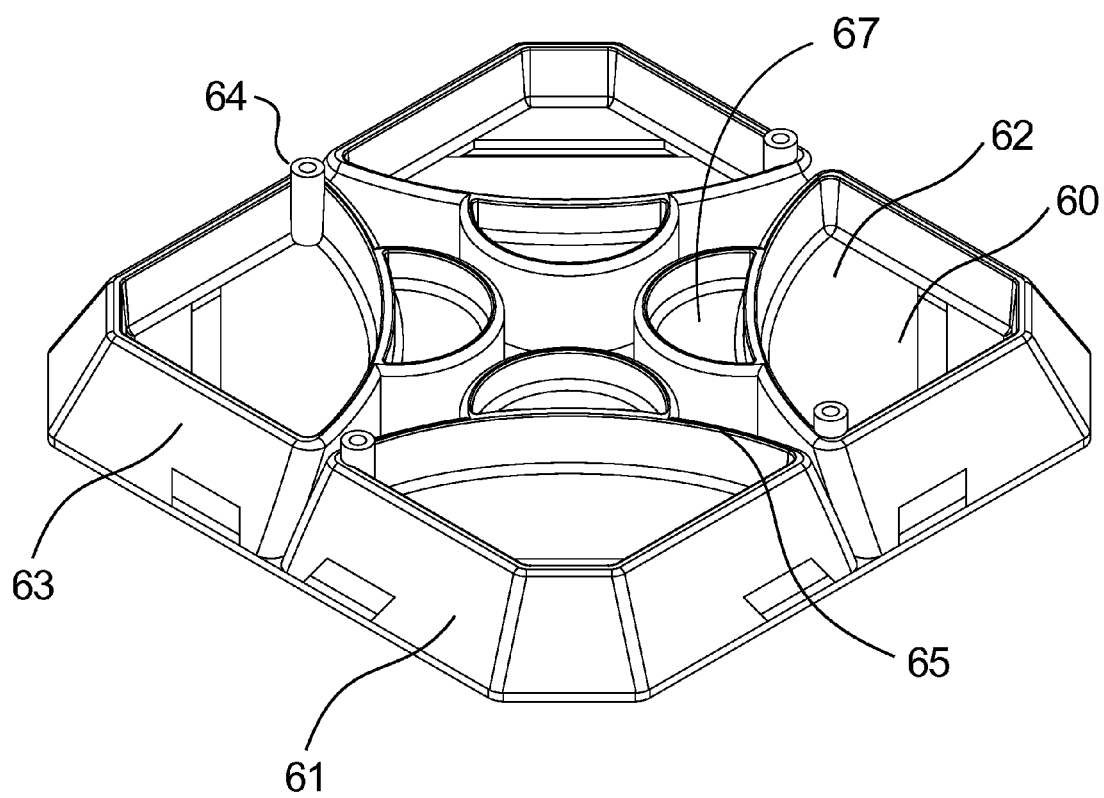
FIG. 13 is a perspective view showing the base portion of FIG. 12.
Figure 14:
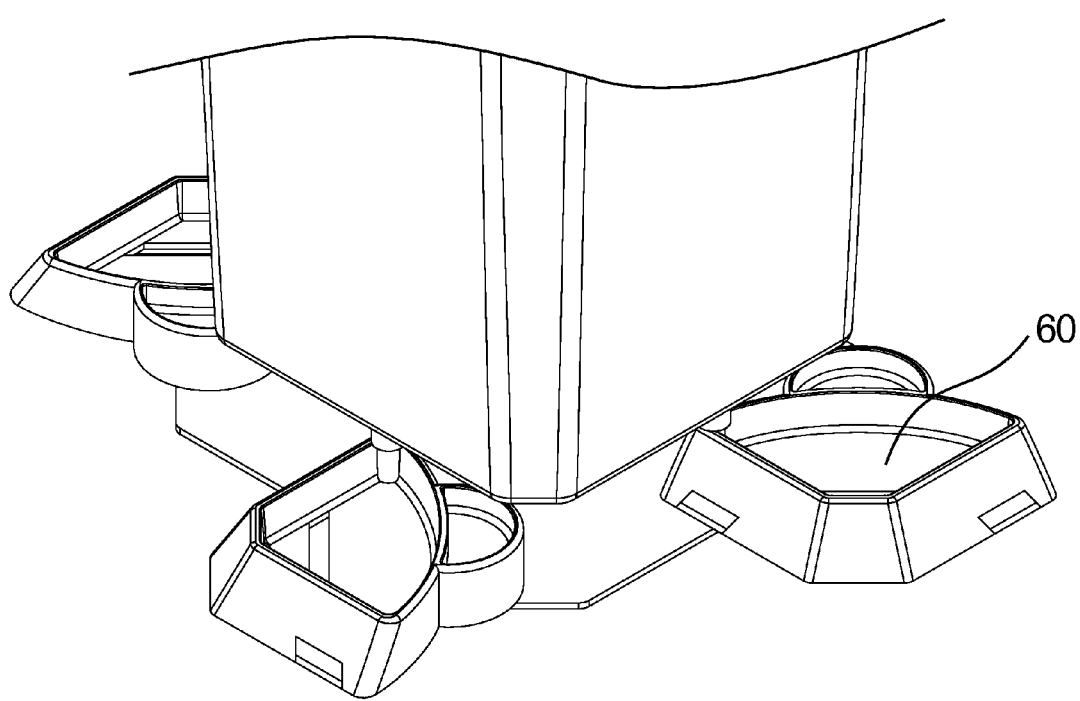
FIG. 14 is a perspective view, showing the areas for trapping or poisoning rotated outwardly for maintenance.

As shown in FIGS. 12-14, another example of base portion is also provided. In this example, the container portion 1 is fixed on the base portion 2 with a gap 32 between them. The base portion includes four trapping or poisoning areas (though the number could be varied as desired). The trapping or poisoning areas 60 are formed by outer wall 61 and an inner wall 65, and bottom 62. The outer surface 63 of outer wall 61 along the gap is sufficiently textured and preferably ramped so that a bed bug or roach can climb, and the inner surface of the outer wall 61 is sufficiently smooth that a bed bug cannot climb out. Preferably there is also a lure chamber 67 for attractants appropriate to the type of insect being targeted.

Each of the trapping or poisoning areas is rotatable along an axis 64 which is on the outer wall. As shown in FIG. 14, all of the trapping or poisoning areas can be rotated out of the base for maintenance or component replacement.

Third Alternative Embodiment

Figure 15:
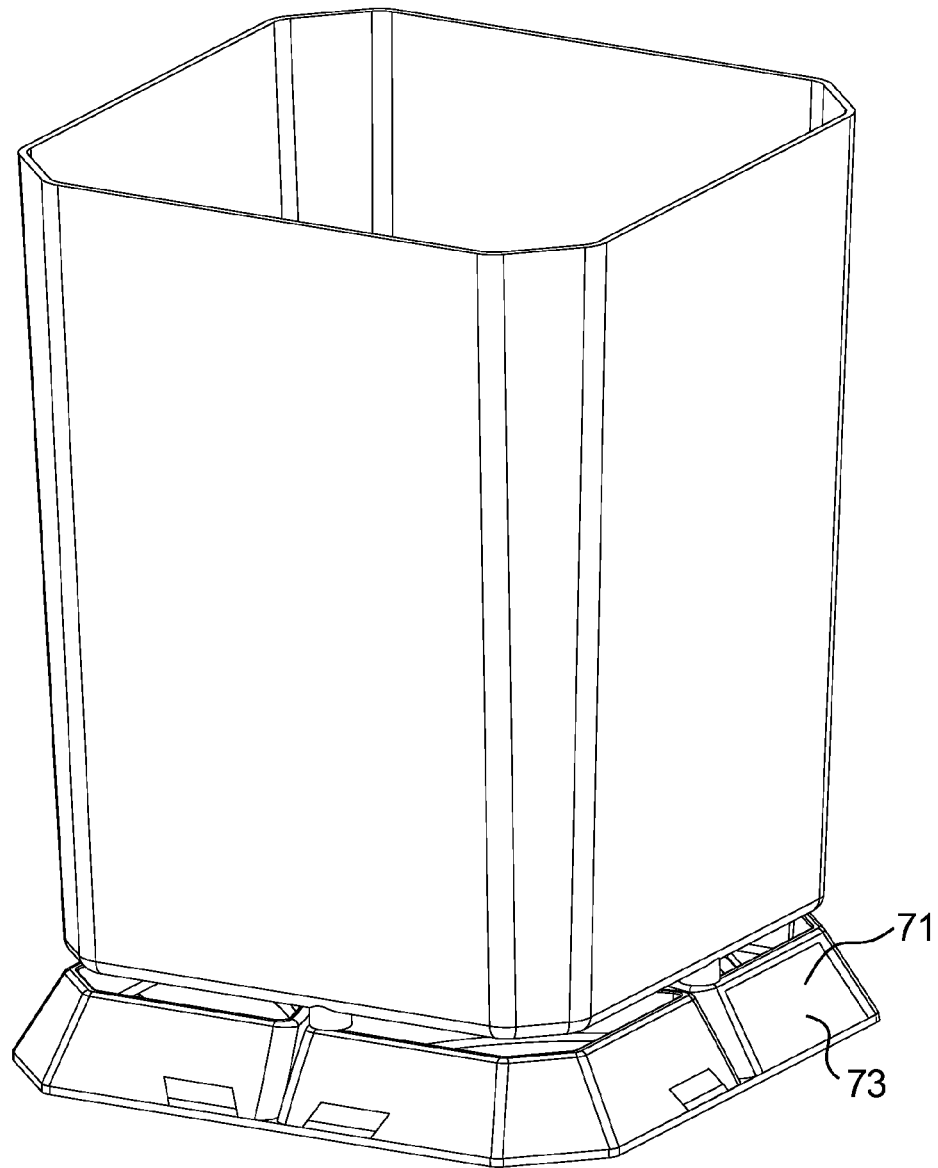
FIG. 15 is a perspective view of a fourth example of the invention, in which portions of the outer walls of the base portion can be flipped open for access to the areas for trapping or poisoning.
Figure 16:
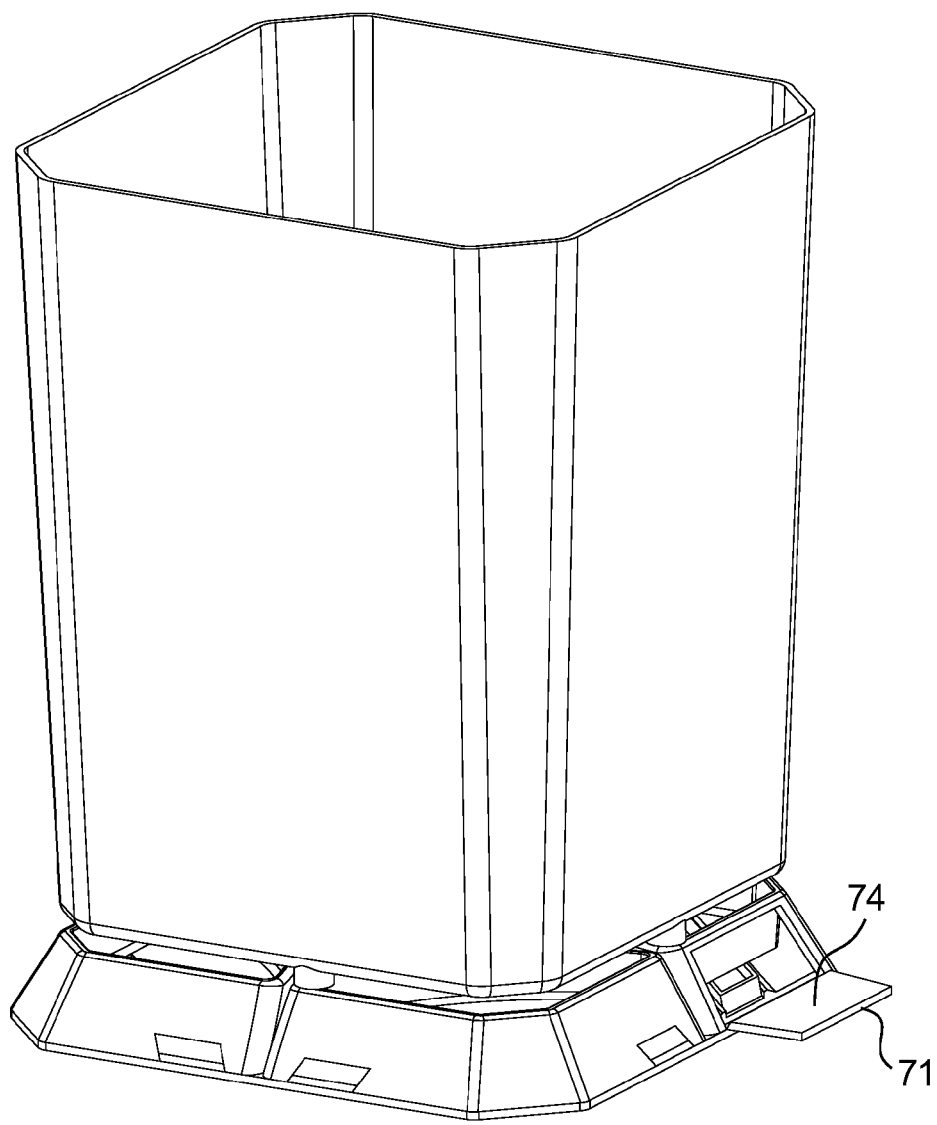
FIG. 16 is perspective view corresponding to FIG. 15, with an outer wall portion flipped open.

Another example of the base portion is shown in FIGS. 15 and 16. In this example, the trap has an outer wall which can be opened.

Similar to the second alternative embodiment described above, the base portion is separated into more than one insect combating area. Trapping or poisoning means such as a glue pad or strip for example, and preferably attracting means, are provided on removable and replaceable trays. The outer surface 73 of outer wall 71 is sufficiently textured and optionally ramped so that bed bugs or roaches can climb. Door 74, as part of the outer wall 71, can be flipped open as in FIG. 16), so the tray can be pulled out for maintenance, e.g. cleaning and/or component replacement.

In General

On all the glue pads or strips, bed bug lures (kairomones and/or pheromones) and roach lures can also be included, either deposited on the surface of the drawer (or tray if one is used), or in separate compartments (not specifically illustrated) of the drawer or tray. Alternatively, the chemical attractants or roach or ant lures can be contained in or be put on the glue pad itself, for example at opposite ends of the tray.

The attracting means are optional, but can be any suitable attractants that are used for bed bugs or roaches or ants. Preferably, bed bugs are attracted to the device by one or more of three attracting means, namely heat, chemical attractants and carbon dioxide.

The assembly may be adapted for trapping different types of insects, i.e. other than bed bugs, roaches and ants, by adjusting the insect combating means and any attractants as appropriate for the targeted insect(s).

It will be evident to those knowledgeable in the field of the invention that many variations on the examples described above are conceivable within the scope of the invention. It should therefore be understood that the claims which define the invention are not restricted to the specific examples described above.

Further variations may be apparent or become apparent to those knowledgeable in the field of the invention, within the scope of the invention as defined by the claims which follow.

The invention claimed is:

1. A combined waste basket and bed bug trap assembly, comprising a waste basket portion and a base portion, the base portion having bed bug combating means therein, comprising trapping and/or poisoning means to trap and/or poison bed bugs, the assembly being operable between a closed position where the waste basket portion covers the bed bug combating means to block access thereto except via one or more gaps sized sufficiently to permit bed bugs to enter, and an open position where the bed bug combating means can be accessed for cleaning, maintenance, or component replacement; wherein said waste basket portion is pivotally mounted about a vertical axis on said base portion to swing away from said closed position, where the waste basket portion covers said base portion to make an interior of the base portion substantially hidden, to said open position, where the interior of said bed bug combating means is exposed; the base portion has an outer wall, the outer wall with at least a portion thereof being at least one of textured and angled for bed bugs to climb to said one or more gaps and into said base portion.

2. An assembly as in claim 1, wherein said one or more gaps are formed between the outer wall of the base portion and a cover around the outer wall.

3. An assembly as in claim 1, wherein said one or more gaps are formed between the waste basket portion and the outer wall of the base portion.

4. An assembly as in claim 1, wherein the base portion is configured to contain replaceable bed bug attracting means.

5. An assembly as in claim 4, wherein said bed bug attracting means comprises at least one means selected from the group consisting of: a carbon dioxide generator; a heat source; a bait; and a chemical or biochemical lure.

6. An assembly as in claim 1, wherein said bed bug combating means includes a glue pad.

7. An assembly as in claim 1, further comprising locking means to secure said waste basket portion to said base portion in said closed position.

8. An assembly as in claim 1, wherein the waste basket portion has a removable bottom whereby said insect combating means may be accessed for cleaning, maintenance, or component replacement.

\* \* \* \* \*